(12) United States Patent
Gruenberg

(10) Patent No.: US 8,480,461 B2
(45) Date of Patent: Jul. 9, 2013

(54) VEHICLE REGISTER AIR FLOW STRAIGHTENER

(75) Inventor: Mark Gruenberg, Westland, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 1666 days.

(21) Appl. No.: 11/872,824

(22) Filed: Oct. 16, 2007

(65) Prior Publication Data

US 2009/0098818 A1  Apr. 16, 2009

(51) Int. Cl.
*B60H 1/34* (2006.01)
*F15D 1/04* (2006.01)

(52) U.S. Cl.
USPC .............................. 454/152; 454/155; 138/39

(58) Field of Classification Search
USPC ...................... 454/152, 155; 138/39
See application file for complete search history.

(56) References Cited

U.S. PATENT DOCUMENTS

| | | | | |
|---|---|---|---|---|
| 2,001,801 A | * | 5/1935 | Smith, Jr. | 454/335 |
| 2,661,239 A | * | 12/1953 | Tirrell | 239/77 |
| 3,279,883 A | * | 10/1966 | Thompson et al. | 422/4 |
| 3,494,379 A | * | 2/1970 | Hinden | 138/39 |
| 3,602,262 A | * | 8/1971 | Hinden | 138/39 |
| 4,709,622 A | * | 12/1987 | Stouffer et al. | 454/125 |
| 4,807,523 A | * | 2/1989 | Radtke et al. | 454/137 |
| 5,129,225 A | | 7/1992 | Tonks | |
| 5,752,877 A | * | 5/1998 | Sun | 454/155 |
| 5,816,907 A | * | 10/1998 | Crockett | 454/155 |
| 5,902,181 A | | 5/1999 | Bain | |
| 6,019,676 A | * | 2/2000 | Kim | 454/155 |
| 6,059,652 A | * | 5/2000 | Terry et al. | 454/155 |
| 6,092,988 A | * | 7/2000 | Botros | 415/191 |
| 6,290,266 B1 | * | 9/2001 | Kawano | 285/125.1 |
| 6,394,891 B1 | * | 5/2002 | Arold | 454/155 |
| 6,443,831 B2 | * | 9/2002 | Yabuya et al. | 454/155 |
| 6,582,293 B1 | * | 6/2003 | Siniarski et al. | 454/155 |
| 6,773,340 B2 | * | 8/2004 | Nakagawa et al. | 454/144 |
| 6,887,148 B2 | | 5/2005 | Biasiotto et al. | |
| 6,974,376 B2 | * | 12/2005 | Yamaguchi et al. | 454/146 |
| 6,974,377 B2 | * | 12/2005 | Gehring et al. | 454/152 |
| 7,044,849 B2 | | 5/2006 | Dippel | |
| 7,241,216 B2 | | 7/2007 | Kamsma | |
| 7,594,518 B2 | * | 9/2009 | Issagholian-Havai | 138/37 |
| 8,251,406 B2 | * | 8/2012 | Kawano | 285/179 |
| 2003/0139132 A1 | | 7/2003 | Derx | |
| 2004/0192185 A1 | | 9/2004 | Le | |
| 2006/0052050 A1 | * | 3/2006 | Malott et al. | 454/307 |
| 2008/0200110 A1 | * | 8/2008 | Ghosh et al. | 454/160 |

FOREIGN PATENT DOCUMENTS

JP        61143648 A  *  7/1986

* cited by examiner

*Primary Examiner* — Steven B McAllister
*Assistant Examiner* — Frances H Kamps

(57) ABSTRACT

An HVAC duct system of a vehicle includes an air duct for providing a passageway for forced conditioned air. The air duct having a first imaginary axis extending substantially parallel with the passageway. An air duct register having plurality of vane-like members for directing the flow of air as it exits the register is coupled to the air duct. An opening of the air duct register defines an imaginary plane. The register has a second imaginary axis extending perpendicular to the imaginary plane of the register. An air flow straightener disposed within the air duct juxtaposed to the register and includes an air guide member. The air guide member receives the forced air flowing through the air duct in a direction substantially parallel with the first imaginary axis and redirects the forced air in a direction substantially parallel with the second imaginary axis for reducing noise as air passes the vanes.

7 Claims, 4 Drawing Sheets

VEHICLE REGISTER AIR FLOW STRAIGHTENER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of Invention

This invention relates in general relates to HVAC systems, and in particular to air flow straigtener within an air duct.

2. Background of Related Art

Vehicle HVAC systems include an air duct system having a plurality of register openings for delivering conditioned air to a vehicle interior. The vehicle air duct system typically includes a primary air duct having one or more secondary ducts for providing forced air to various locations of the vehicle. The secondary air ducts branch off from the primary air duct for delivering the forced air to predetermined locations of the vehicle. Registers are ventilation openings integrated into the instrument panel/console or other interior trim work of the vehicle that allow the forced air to enter the vehicle interior from the air duct system. The registers typically include a plurality of pivoting vanes for directing the air flow as it exits the register opening and into to the interior of the vehicle. Such registers are typically located within or below the front instrument panel.

As is common in most vehicles, the primary air duct runs substantially parallel with the vehicle's front instrument panel. A secondary air duct branches off the primary air duct at a substantially perpendicular angle. The secondary air duct extends at a substantially perpendicular angle to the front instrument panel. However, the front instrument panel is not a single planar surface. Rather, the front instrument panel may include various planar surfaces, or even non-planar surfaces for that matter, juxtaposed to one another which form the front instrument panel. As a result, due to the varying angles at which the planar or non-planar surfaces are formed to one another, the respective air duct may be coupled to a respective area of the front instrument panel at an angle other than 90 degrees. As a result of such a coupling of the respective air duct to the front instrument panel, the register opening may not be positioned parallel with the flow of air exiting the respective air duct. That is, the register opening may be mounted to the air duct which results in at least a portion of the air flowing through the opening of the air duct being non-parallel to the register opening (i.e. non-parallel with the vanes in the register opening). The abrupt change of direction as the airflow passes from the duct to the register results in turbulent air flow. The turbulent air flow passing by the vanes of the register opening causes audible NVH to a passenger of the vehicle as a result of the turbulent separation of the airflow streams.

BRIEF SUMMARY OF THE INVENTION

The present invention has the advantage of redirecting forced air flowing through an air duct of a vehicle in a direction parallel with the vanes of a register opening for reducing NVH as the result of turbulent air flow across the vanes of the register opening which is generated when the air duct is non-perpendicular to the opening of the register.

In one aspect of the present invention, an HVAC duct system of a vehicle includes an air duct for providing a passageway for forced conditioned air. The air duct having a first imaginary axis extending substantially parallel with the passageway. An air duct register coupled to the air duct discharges forced air within the air duct to an interior of the vehicle. An opening of the air duct register defines an imaginary plane. The register having a second imaginary axis extending perpendicular to the imaginary plane of the register. The register includes a plurality of vane-like members for selectively directing the flow of air as it exits the register. The first and second imaginary axes are non-parallel. An air flow straightener disposed within the air duct and juxtaposed to the register. The air flow straightener includes an air guide member. The air guide member receives the forced air flowing through the air duct in a direction substantially parallel with the first imaginary axis and redirects the forced air in a direction substantially parallel with the second imaginary axis for producing a substantially laminar flow of conditioned air as the forced air passes the vanes resulting in a reduction of noise.

An air flow straightener is disposed within an air duct of a vehicle for directing forced air at an opening of a register. The opening of the register defines an imaginary plane, the register includes a plurality of vanes for re-directing forced air exiting the register opening. The air duct is coupled to the register at an angle which would allow an unaltered flow of air to produce a turbulent flow of forced air to the vanes of the register. The air flow straightener includes a body. The air flow straightener further includes at least one air guide member integrally formed with the body including an entrance section substantially parallel with a passageway of the air duct, an exit section substantially perpendicular to an imaginary plane, and an intermediate section therebetween. The entrance section receiving forced air within the air duct and directing the forced air to the exit section via the intermediate section for directing air through an opening of the register. The intermediate section providing a smooth transition between the entrance section and the exit section for preventing a formation of turbulent air flow in the register.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
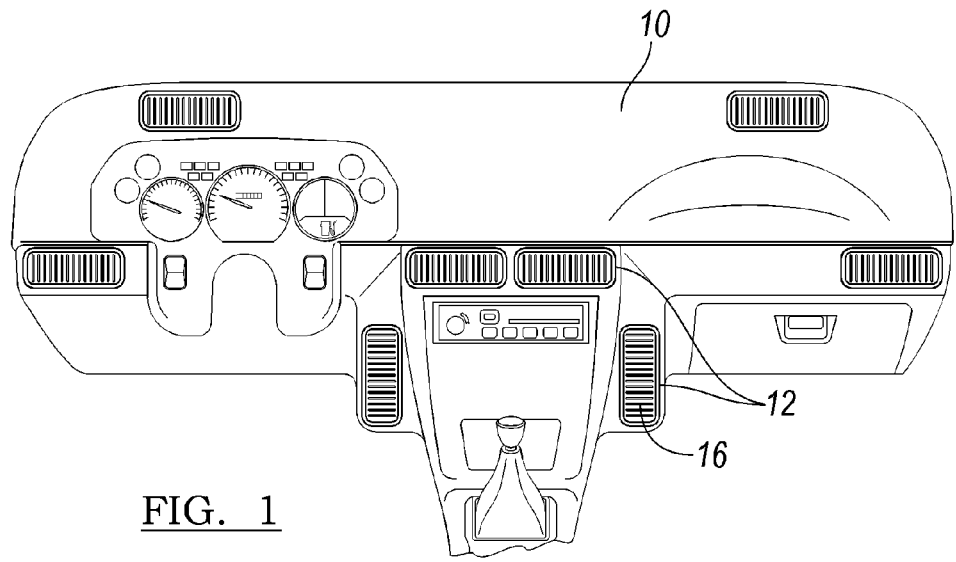
FIG. 1 is a perspective view of a vehicle front instrument panel of the present invention.

Referring now to the drawings, there is illustrated in FIG. 1 a drawing of a front instrument panel 10 of a passenger compartment of a vehicle incorporating ventilation registers 12 for outputting forced conditioned air from an HVAC system. The registers 12 are positioned for providing conditioned air to the passengers seated in a passenger compartment of the vehicle. The registers 12 are disposed along the front instrument panel 10 in addition to below the front instrument panel 10. The front instrument panel 10 may include one or more planar or curved surfaces that a formed non-planar to one another.

The registers 12 include openings having a plurality of louver-style vanes 16 that are directable for directing heating and cooling air flow into the vehicle interior. The plurality of vanes 16 may be moveable between an open and closed position so that a person seated in a respective region of the passenger compartment may reduce the flow of forced air to a respective region of the vehicle interior.

Figure 2:
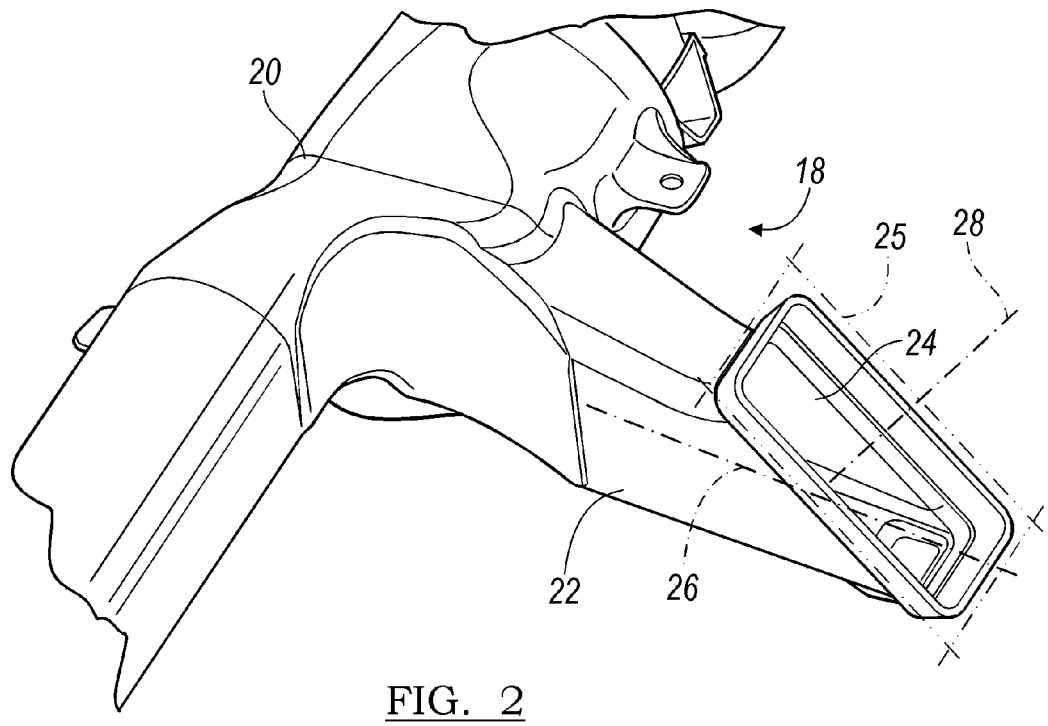
FIG. 2 is a perspective view of a vehicle HVAC air duct of the present invention.
Figure 3:
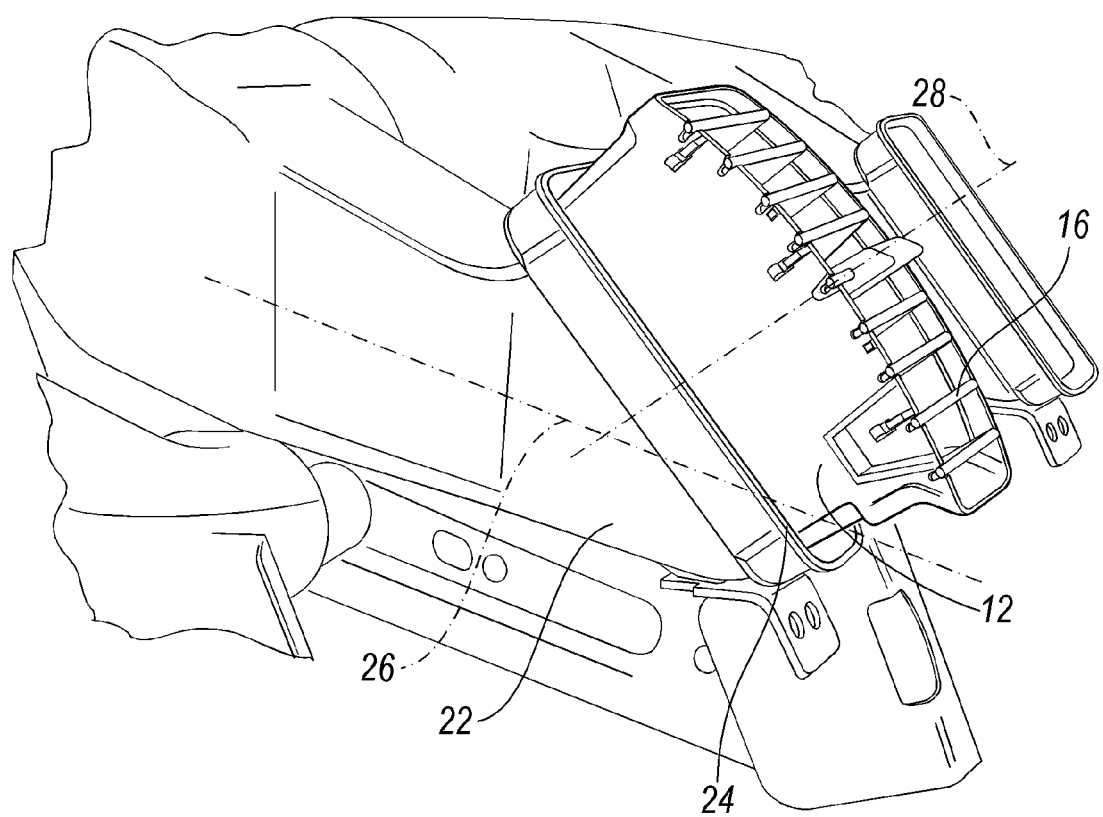
FIG. 3 is a perspective view of the air duct-register assembly of the present invention.

FIGS. 2 and 3 illustrate an air duct 18 for a vehicle HVAC system. The air duct 18 includes a primary air duct 20 and a secondary air duct 22. The primary air duct 20 is disposed behind the vehicle front instrument panel 10 (as shown in FIG. 1). The primary air duct 20 extends substantially parallel with the front instrument panel 10.

The secondary air duct 22 is integrally formed with the primary air duct 20 and is mounted on a vehicle frame member (shown in FIG. 3). The secondary air duct 22 branches off from primary air duct 20 in a substantially perpendicular direction. Alternatively, the secondary air duct 22 may extend from the primary air duct 20 at a non-perpendicular angle. The secondary air duct 22 extends toward the front instrument panel 10 for providing forced air to the vehicle interior. The HVAC system may include a more than one secondary air duct branching off the main duct for providing forced air to various regions of the vehicle interior.

The secondary air duct 22 includes an opening 24 for attachment to the register 12 of the vehicle front instrument panel 10 (shown in FIG. 1). The opening 24 is integrally formed as part of the secondary air duct 22 and is configured to be coupled to the register 12 (shown in FIG. 1). An opening of the register 12 that mates with the opening 24 of the secondary air duct 22 defines an imaginary plane 25. As discussed earlier, the vehicle front instrument panel 10 is formed from a plurality of surfaces that are non-planar to one another. The opening 24 is formed at an angle established by the front instrument panel 10 relative to the secondary air duct 22 for accommodating the alignment between the vehicle front instrument panel 10 and the secondary air duct 22. Therefore, the opening 24 is formed relative to the main passage of the secondary air duct 22 such that an imaginary axis, shown generally at 26, extending through the secondary air duct 22 is non-parallel to an imaginary axis, shown generally at 28, extending through the opening 24 and the opening of the register 12. The imaginary axis 28 is substantially perpendicular to the imaginary plane 25.

As air is being forced through the secondary air duct 22 to the opening of the register 12 which attached to the air duct opening 24, unaltered forced air flows to the register 12 in a non-parallel direction to the plurality of vanes 16 as it enters the opening of the register 12 resulting in a turbulent flow of forced air at the plurality of vanes 16 due to the angle of the register 12 (i.e., imaginary axis 28) in relation to the secondary air duct 22 (i.e. imaginary axis 26). The turbulent flow of forced air against the plurality of vanes 16 results in audible NVH as heard by a passenger within the vehicle.

Figure 4:
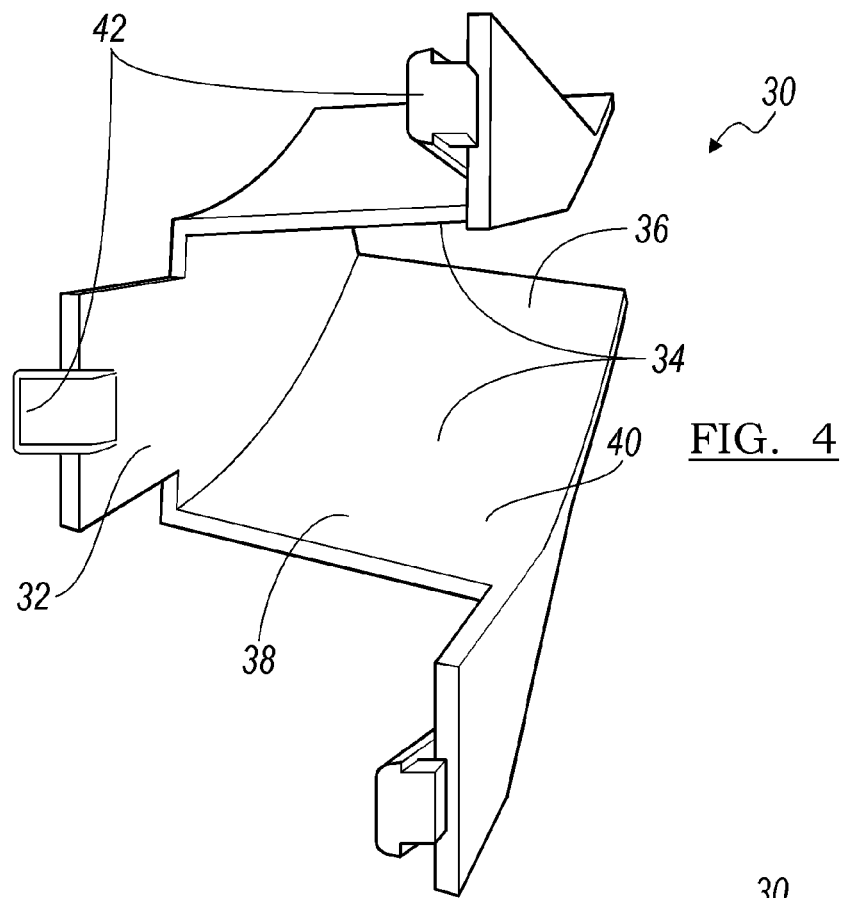
FIG. 4 is a perspective view of an air flow straightener of the present invention.
Figure 5:
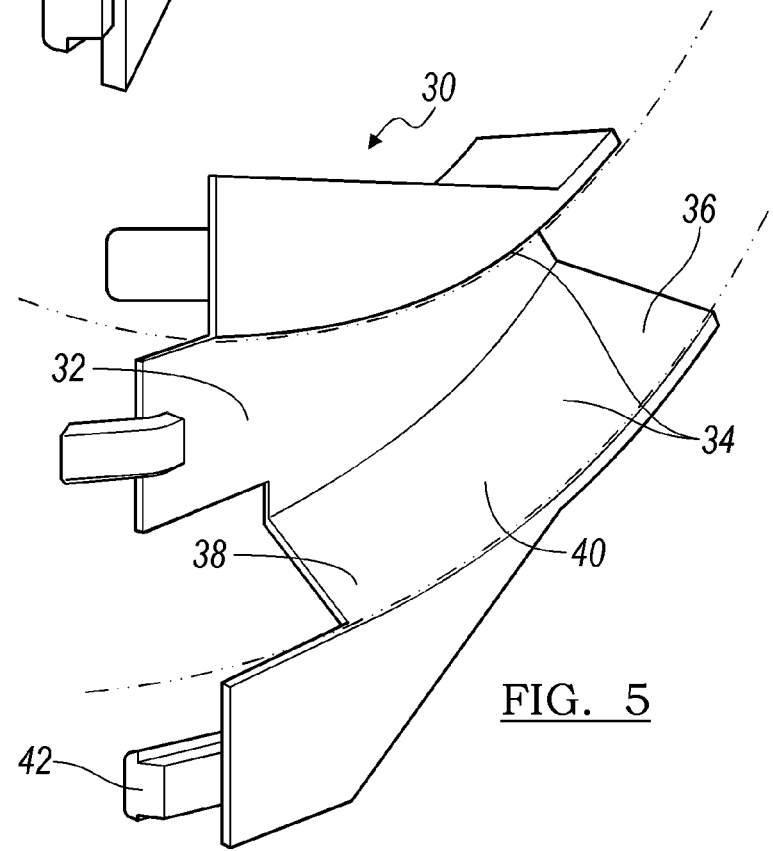
FIG. 5 is a perspective view of an air flow straightener of the present invention.

FIGS. 4 and 5 illustrate an air flow straightener 30 of the present invention. The air flow straightener 30 includes a body portion 32 and at least one air guide member 34 integrally formed to the body portion 32. The air guide member 34 includes a first end section 36 and a second end section 38. The first end section 36 is formed so that when the air flow straightener 30 assembled in the secondary air duct 22, the first end section 36 is substantially parallel with the imaginary axis 24 of the passageway of the secondary air duct 22. The second end section 38 is formed so that the second end section 38 is substantially parallel with the imaginary axis 26 of the opening of the register 12. One or more intermediate sections 40 are disposed between the first end section 36 and the second end section 38 for connecting the first end section 36 to the second end section 38. Preferably the first end section 36, the second end section 38, and the intermediate section 40 are formed as a single unit by an injection or blow molding process. Alternatively, the first end section 36, second end section 38, and the intermediate section 40 may be formed as separate members and coupled to one another. Furthermore, each of the air guide members 34 are preferably arcuate shaped for gradually redirecting the flow of forced air, although each of the respective sections of the air guide members 34 may be formed from substantially planar sections for cooperatively redirecting the air flow.

As shown in FIG. 5, the air flow straightener 30 includes a plurality of air guide members 34 in spaced relation to one another. The plurality of air guide members 34 may be spaced evenly or unevenly from one another. Furthermore, any number of air guide members may be used as long as the each of the air guide members direct the flow of air in the same direction such that the resulting air flow stream results in a laminar flow of air.

Figure 6:
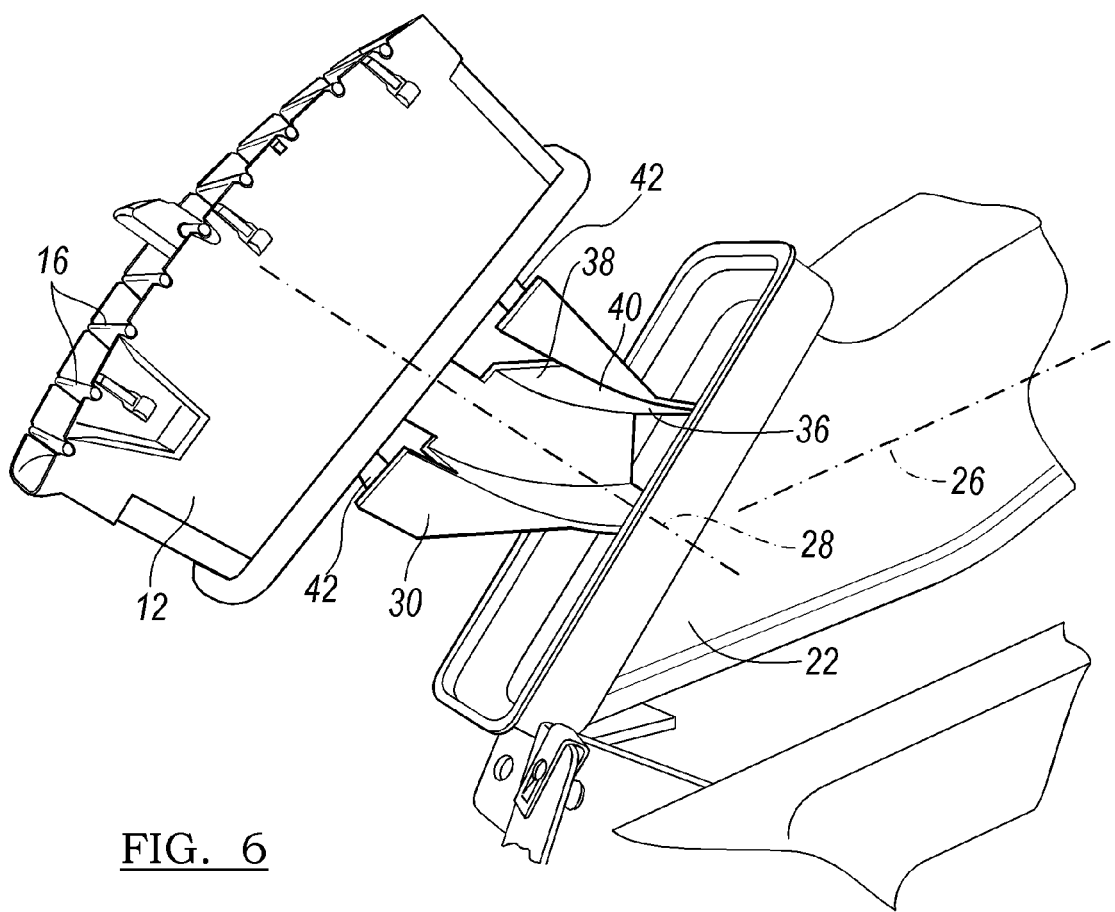
FIG. 6 is a perspective view of register assembly of the present invention.

FIG. 6 illustrates the air flow straightener 30 coupled to the register 12. The air flow straightener 30 is detachable to the register 12 by a plurality of clips 42. The clips 42 function as tab members which are inserted within the rear of the register 12 for securing the air straightening member 30 to the register 12. The clips 42 are molded as part of the air straightening member 30 which alleviates the requirement of adding attaching hardware. Alternatively, fasteners may be used for securing the air straightening member 30 to the register 12. The opposing side of air straightening member 30 is free floating and requires no clips or other types of fasteners other than the clips 42 secured to the register 12. Moreover, the air flow straightener is stationary when disposed within the air flow passage of the secondary air duct 22.

In an alternative embodiment, the air flow straightener 30 may be integrally formed as part of the register 12 as part of a molding process where the air flow straightener 30 and the register 12 are formed as a single unit to during an injection molding or blow molding process. In yet another alternative embodiment, the air flow straightener 30 may be integrally formed as part of the secondary air duct 22. In this embodiment, attachment of the air flow straightener 30 to the register 12 is not required. However, clips 42 may be included for attachment to the register 12 if a secure attachment is required.

As shown in FIG. 6, the first end section 36 of the air guide member 34 is aligned with the imaginary axis 26 of the secondary air duct 22. The second end section 38 of the air guide member 34 is aligned with the imaginary axis 28 of the opening of the register 12. The intermediate section 40 is arcuate shaped for redirecting the flow of forced air from the secondary air duct 22 as received by the first end section 26 and the second end section 28 and thereafter through the opening of the register 12 in a direction that is substantially parallel to the imaginary axis 26 of the opening of the register 12.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An HVAC duct system of a vehicle comprising:
   an air duct for providing a passageway for forced conditioned air, the air duct having a first imaginary axis extending substantially parallel with the passageway;
   an air duct register coupled to the air duct for discharging forced air within the air duct to an interior of the vehicle, an opening of the air duct register defining an imaginary plane, the register having a second imaginary axis extending perpendicular to the imaginary plane of the register, the register including a plurality of vane-like members for selectively directing the flow of air as it exits the register, wherein the first and second imaginary axes are non-parallel; and
   an air flow straightener disposed within the air duct and juxtaposed to the register, the air flow straightener including a plurality of air guide members, wherein each air guide member includes a first end section aligned with the first imaginary axis and a second end section aligned with the second imaginary axis, wherein each air guide member receives the forced air flowing through the air duct in a direction substantially parallel with the first imaginary axis and redirects the forced air in a direction substantially parallel with the second imaginary axis for producing a substantially laminar flow of conditioned air as the forced air passes the vanes resulting in a reduction of noise;
   wherein the second end section of the air flow straightener includes a plurality of integrally formed clips for attachment and detachment to the register, and wherein the first end section of the air flow straightener disposed within the air duct is free floating.

2. The HVAC duct system of claim 1 wherein the air guide member is arcuate-shaped.

3. The HVAC duct system of claim 1 wherein the air flow straightener is coupled to the register and extends into the air duct.

4. The HVAC duct system of claim 1 wherein in the air flow straightener is permanently fixed in orientation within the air duct.

5. An air flow straightener disposed within an air duct of a vehicle for directing forced air at an opening of a register, the opening of the register defining an imaginary plane, the register including a plurality of vanes for re-directing forced air exiting the register opening, the air duct being coupled to the register at an angle which would allow an unaltered flow of air to produce a turbulent flow of forced air to the vanes of the register, the air flow straightener comprising:
   a body; and
   a plurality of air guide members integrally formed with the body including an entrance section substantially parallel with a passageway of the air duct and an exit section substantially perpendicular to the imaginary plane and an intermediate section therebetween, each of the air guide members including a first end section substantially parallel with the passageway of the air duct and a second end section substantially perpendicular to the imaginary plane, the entrance section receiving forced air within the air duct and directing the forced air to the exit section via the intermediate section for directing air through an opening of the register, the intermediate section providing smooth transition between the entrance section and the exit section for preventing a formation of turbulent air flow in the register;
   wherein the second end section of the air flow straightener includes a plurality of integrally formed clips for attachment and detachment to the register, and wherein the first end section of the air flow straightener disposed within the air duct is free floating.

6. The air flow straightener of claim 5 wherein the entrance section, the intermediate section, and the exit section form a substantially arcuate-shaped air-guide member.

7. The air flow straightener of claim 5 wherein the plurality of guide members re-directs forced air in a direction that is substantially parallel with the vanes of the register.

* * * * *